United States Patent
Charnesky et al.

(12)

(10) Patent No.: US 9,013,054 B1
(45) Date of Patent: Apr. 21, 2015

(54) WIND TURBINE WITH CHANNELS AND ROOF AIR EXHAUST

(71) Applicant: BX Power, LLC, Beaumont, CA (US)

(72) Inventors: Craig Charnesky, Beaumont, CA (US); Bridget Cantu, Beaumont, CA (US)

(73) Assignee: BX Power, LLC, Beaumont, CA (US)

( * ) Notice: Subject to any disclaimer, the term of this patent is extended or adjusted under 35 U.S.C. 154(b) by 0 days.

(21) Appl. No.: 13/945,827

(22) Filed: Jul. 18, 2013

Related U.S. Application Data

(60) Provisional application No. 61/673,675, filed on Jul. 19, 2012.

(51) Int. Cl.
| | |
|---|---|
| *F03B 15/00* | (2006.01) |
| *F03D 1/06* | (2006.01) |
| *F03D 9/00* | (2006.01) |

(52) U.S. Cl.
CPC .............. *F03D 1/0608* (2013.01); *F03D 9/002* (2013.01)

(58) Field of Classification Search
CPC .............. F03D 1/04; F03D 3/04; Y02E 10/74
USPC ..................................... 290/44, 55
See application file for complete search history.

(56) References Cited

U.S. PATENT DOCUMENTS

| | | | | |
|---|---|---|---|---|
| 4,452,046 | A * | 6/1984 | Valentin ..................... | 60/641.11 |
| 6,674,181 | B2 * | 1/2004 | Harbison ........................ | 290/55 |
| 7,211,905 | B1 * | 5/2007 | McDavid, Jr. ............. | 180/65.31 |
| 7,245,039 | B2 * | 7/2007 | DuHamel ...................... | 290/44 |
| 7,427,173 | B2 * | 9/2008 | Chen ............................. | 404/71 |
| 8,546,971 | B2 * | 10/2013 | Tsitron .......................... | 290/55 |
| 8,564,154 | B2 * | 10/2013 | Bahari et al. .................. | 290/55 |
| 8,791,588 | B2 * | 7/2014 | Steinlechner .................. | 290/55 |
| 2010/0001532 | A1 * | 1/2010 | Grumazescu .................. | 290/55 |
| 2010/0171314 | A1 * | 7/2010 | Tackett .......................... | 290/55 |

\* cited by examiner

*Primary Examiner* — Tho D Ta
(74) *Attorney, Agent, or Firm* — Knobbe Martens Olson & Bear LLP

(57) ABSTRACT

This wind turbine is enclosed in a housing structure with a bell shaped opening and a stack effect created on the roof. One side of the housing, facing the wind, opens up to receive air. The air that enters the housing is divided into multiple chambers. The chambers and turning vanes guide the air directly to the blades and help in minimizing air turbulence. The blades are angled to receive the maximum amount of the air. The air rotates the blades turning the rotor, converting mechanical rotation into electrical power. There is a horizontal rotor attached to vertical shaft which is used to generate electrical energy. The stack effect on the roof creates a negative air flow aiding in turning the rotor.

18 Claims, 13 Drawing Sheets

WIND TURBINE WITH CHANNELS AND ROOF AIR EXHAUST

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This Application claims the benefit of U.S. Provisional Application No. 61/673,675 filed Jul. 19, 2012.

BACKGROUND OF THE INVENTION

1. Field of the Invention

The present invention relates to wind turbines and, in particular, to wind turbines that have reduced profiles and enclosed rotors that are environmentally more friendly.

2. Description of the Related Art

There is a long history of harnessing the power of wind to create energy and electricity. For example, in 1887 a windmill was constructed to generate power and charge batteries. The windmill and many like it have been made in the same tradition with a tall upright standing cylindrical structure with several large blades attached, designed to catch non-turbulent wind from a high vantage point. There are generally multiple sets of gears inside a mechanism connected to a generator for the production of power.

It is a commonly known fact that horizontal and vertical axis turbines share a common attribute; that winds must have a high velocity of wind speed with sufficient power (torque) to produce useful generator output. In addition, they have a relatively low maximum wind velocity that they can operate in before they must be shut down to ensure they are not damaged.

Current designs are 197 to 262 feet in the air, have exposed rotors that are subject to some of the harshest environments, such as wind shears, sunlight, heat, sand, and various other damaging elements, requiring constant maintenance to ensure proper function. The height of the currently designed wind turbines limits their use in some areas, not only for aesthetics, but also because the exposed rotating blades are becoming a major concern for wildlife (such as birds). There is a growing controversy about the number of birds being killed or maimed each and every year by these open blade wind turbines.

Due to new safety regulations pertaining to the placement of some new and old style wind turbines, they are becoming limited and not an option for key locations of constant wind. There are zoning issues and the problem of hydraulic oil seeping into the ground.

Thus, there is a need for an improved wind turbine design that is more compact and can be formed in a more aesthetic manner. Further, there is a need for an improved wind turbine design that does not have as significant of an effect on wildlife as existing designs.

SUMMARY OF THE INVENTION

The aforementioned needs are satisfied by the wind turbine of the present invention which in, one implementation, includes a housing having an inlet opening and an exhaust opening. A rotor is rotatably mounted within the housing wherein the rotor has a plurality of blades and is coupled to a generator. The inlet opening is, in one implementation, formed adjacent a side wall of the housing and the exhaust opening is formed adjacent an upper surface of the housing. In one implementation, both the inlet opening and outlet opening are covered with netting or similar structures to inhibit the entry of wildlife into the housing that contains the rotor.

Preferably, a plurality of channels is formed from the inlet opening to the peripheral edges of the rotor so as to direct air from the inlet opening to the bladed surfaces of the rotor. In one implementation, the channels are formed so as to more equally distributed about the circumference of the rotor. In one implementation, there are two rows of channels formed at the inlet opening with a first row of channels being formed so as to direct air to the front side of the rotor and a second row of channels being formed so as to direct air to the back side of the rotor.

In one implementation, an air scoop structure is formed in front of the inlet opening so as to gather and direct air from a surface area that is greater than the inlet opening into the inlet opening. In this implementation, the air scoop structure is preferably formed so as to channel the air towards the inlet opening which increases the pressure of the air as a result of the decrease in the area of the inlet opening.

In one implementation, the exhaust opening is formed so as to have a stack effect that reduces the drag against the rotor and allows the rotor to turn more freely. In one implementation, the rotor is mounted in recess below the exhaust opening.

The rotor, in one implementation, is preferably a ring shaped structure having a plurality of vanes or blades that extend between two races. The blades preferably extend substantially radially outward between the two races and are angled such that air impacting on the blades from the channels in a substantially perpendicular direction to the blades results in a horizontal force against the rotor causing the rotor to rotate.

The enclosed turbine is very versatile in creating energy at unmatched low speeds of 2 mph vs. 8-14 mph with the traditional style turbines, as well as high wind speeds with little or no noise pollution. The enclosed turbine produces little to no air pressure at the top of the unit where the air exit location is, because the wind entering into the unit is being more completely used to create power. This turbine utilizes the housing structure to collect air through a large opening and funneling it to a smaller exit area, which increases the velocity of the air at the exit. The air exits substantially at the blades only.

As discussed above, the roof of the housing structure is designed to create negative airflow, known as stack effect. This aids in turning the rotor. The housing enhances the wind turbine in many ways. It protects the rotor and all the components from the environment, creating less required maintenance as well as ease of maintenance. The housing structure is built to provide easy access to all parts of the wind turbine. The housing also protects this turbine from the typical categories of environmental impact, visual, noise, and wildlife, and protects the rotor, blades and all that makes up the turbine, creating less required maintenance. This wind turbine is quiet in operation and has a lower height of structure compared to typical wind turbines. Their small height enables them to have a variety of uses. One example would be used on the top of buildings. They can also be provided in a wide range of sizes and power generation capabilities. They are scalable and directional, meaning the housing and rotor size can be modified and the opening can be directed to the most optimal air flow direction. A netting, at all open surfaces, helps ensure the protection of wildlife.

The enclosed box turbine is less likely to harm wildlife, such as birds, differing from the turbines built with open blades high off the ground. Birds have been noted to land on the enclosed box turbine and fly away at will. The enclosed turbine can be made in various sizes with the inlet tunnels, blades, structure, and other parts scalable to any size to generate the amount of power desired. A scaled down version could be easily transported and assembled. This style of wind turbine can be built on the ground, on top of a building, or any desired location.

These and other objects and advantages of the present invention will become more apparent from the following description taken in conjunction with the accompanying drawings.

DETAILED DESCRIPTION OF THE PREFERRED EMBODIMENT

Figure 1A:
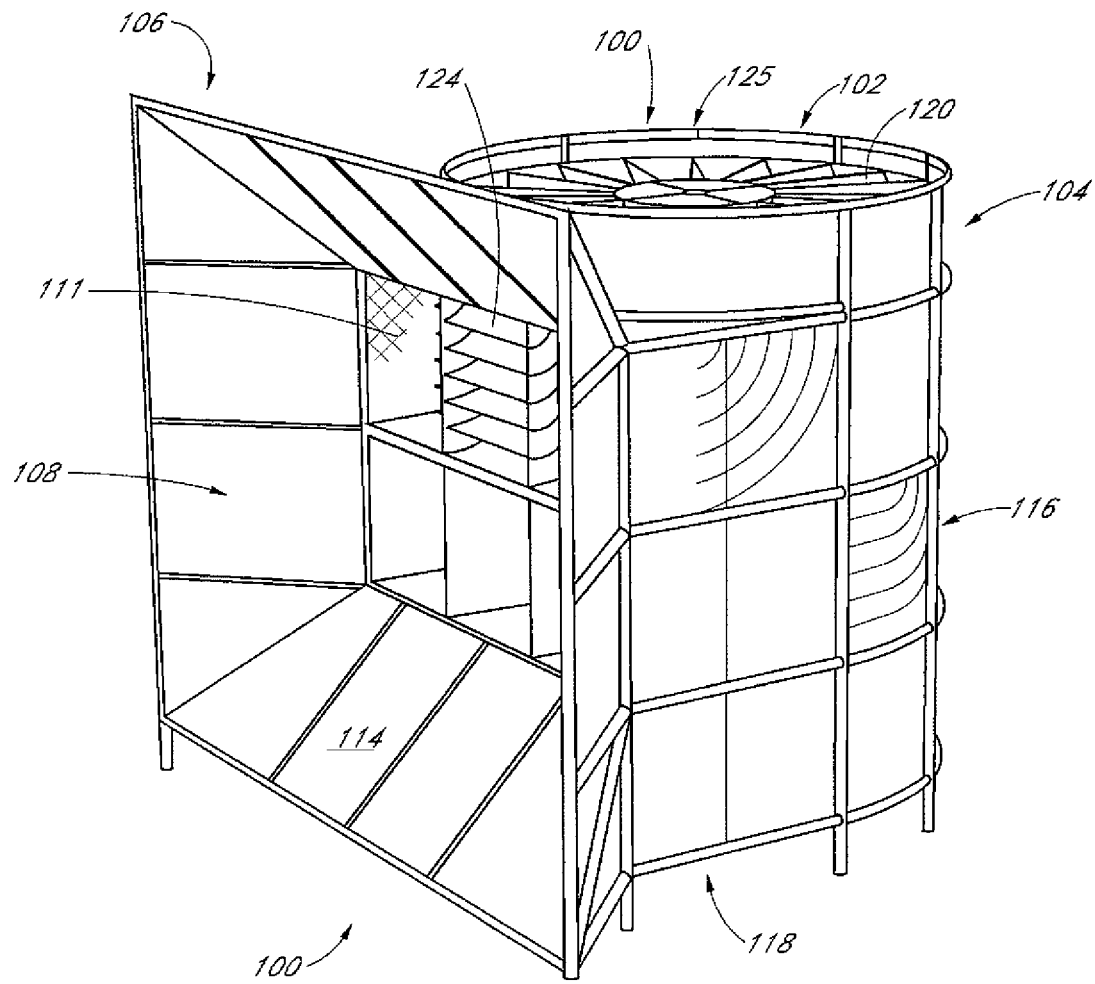
FIGS. 1A and 1B are schematic illustrations of one embodiment of an enclosed wind turbine.
Figure 1B:
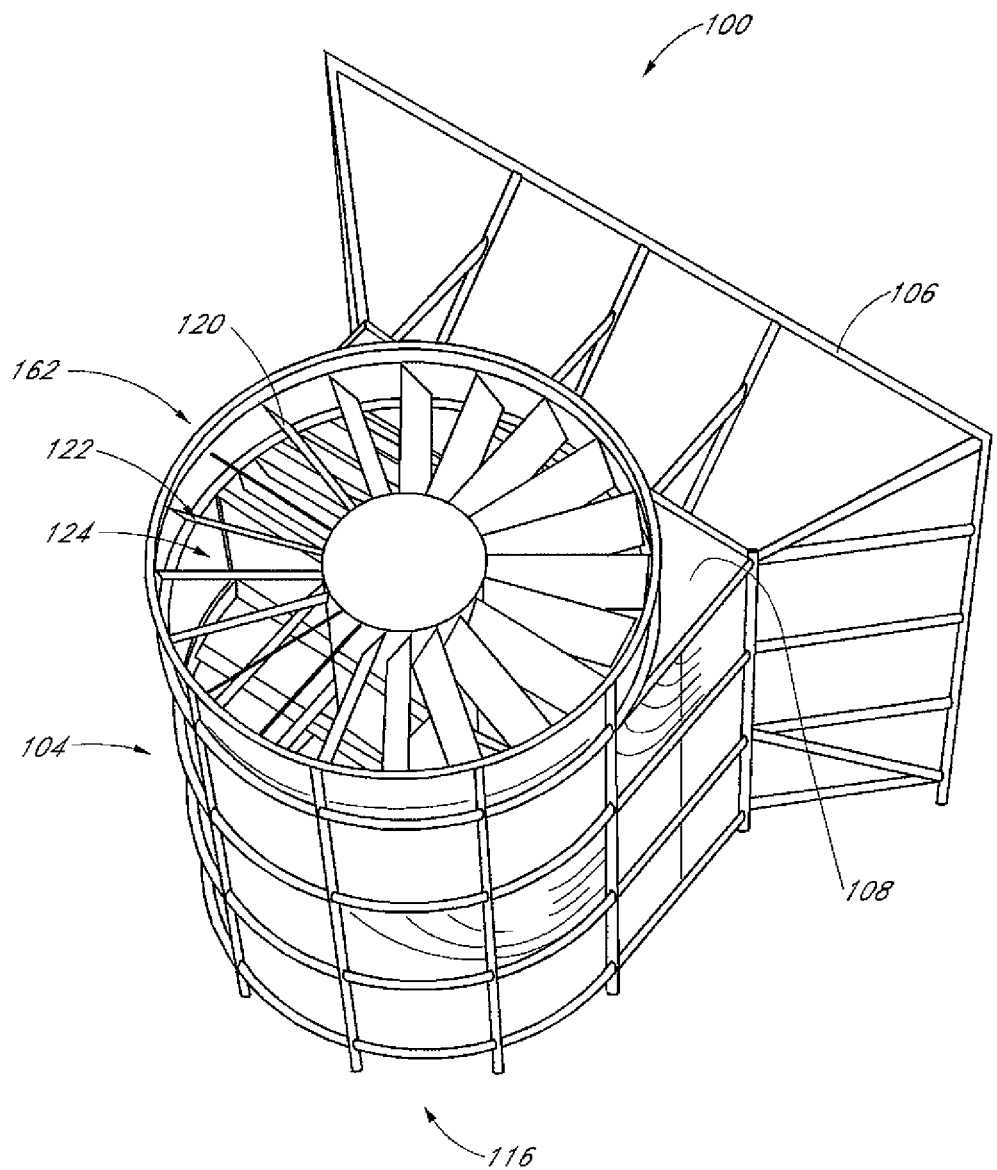

Reference will now be made to the drawings wherein like numerals refer to like parts throughout. As shown in FIGS. 1A-1B, a wind turbine 100 is formed such that a rotor assembly 102 is positioned within a housing 104. The housing 104 includes an air scoop opening assembly 106 that defines an opening 108 that directs air into a plurality of channels 110. As will be described in greater detail below, the channels 110 direct the air to different circumferential locations of the rotor assembly 102 so that force is more equally distributed against the rotor assembly 102.

In one implementation, the air scoop assembly 106 has an air scoop 112 that is comprised of four slanted walls that direct wind into the smaller dimensioned opening 108. In one non-limiting example, the air scoop 112 has exterior dimensions of approximately 12 to 15 feet high by 12 to 15 feet wide and has interior panels 114 that are angled at an angle of approximately 30 to 45 degrees. The interior panels 114 border the opening 108 which has dimensions of approximately 12 feet wide by 8 feet high. It will be appreciated that various modifications to the dimensions described herein can be made by those skilled in the art without departing from the scope of the present invention.

In one implementation there are a total of 6 different channels 110 each having cross sectional dimensions of 4 feet by 4 feet that are arranged into two rows of three channels 110. In this implementation, the top channels direct the air to the side of the rotor assembly 102 that is positioned proximate the opening 108 and the bottom row of channels directs the air to the side of the rotor assembly 102 that is located distal from the opening 108. Lines 114 in FIGS. 1A and 1B detail the pathways defined by the channels 110 that direct the air towards the various different sections of the rotor assembly 102. The channels 110 will be described in greater detail below with respect to FIGS. 3A-3C. As is also schematically shown in FIG. 1A, a screen 111 may also be placed in front of the channels 110 to inhibit animals or birds from entering the housing 104. The channels 110 preferably are configured to alter shape with vanes so that the air is exhausted out of a round opening to match the rounded configuration of the housing 104 in the manner that is described below.

The housing 104 includes a cylindrical section 116 that is sized so as to receive the rotor assembly 102. In one embodiment, the cylindrical section 116 of the housing 104 is sized so as to receive a rotor 120 of the rotor assembly 102 that is approximately 12 feet in diameter, however, the housing can be sized upwards and downwards to accommodate different sizes of rotors depending upon the implementation. The cylindrical section 116 of the housing 104 is, in one implementation, approximately 11 feet tall.

The housing 104 also includes the entry section 118 that is generally rectangular and provides a space through which the channels 110 can be routed from the opening 108 into an interior space 122 of the cylindrical portion 116 of the housing 104. The channels 110 may also include vanes 124 that direct the air flow inward around corners and the like so that less energy of the air flow is lost due to the air travelling through the channels 110.

As is shown in FIGS. 1A and 1B, the rotor 120 of the rotor assembly 102 is mounted so as to be recessed beneath an upper opening 125 of the cylindrical section 116 of the housing 104. The upper opening 125 acts as a stack that draws air out of the cylindrical housing 116 in a manner similar to a smoke stack which improves air flow and reduces back pressure against the rotation of the rotor 120, thereby improving the efficiency of the turbine 100.

Figure 2A:
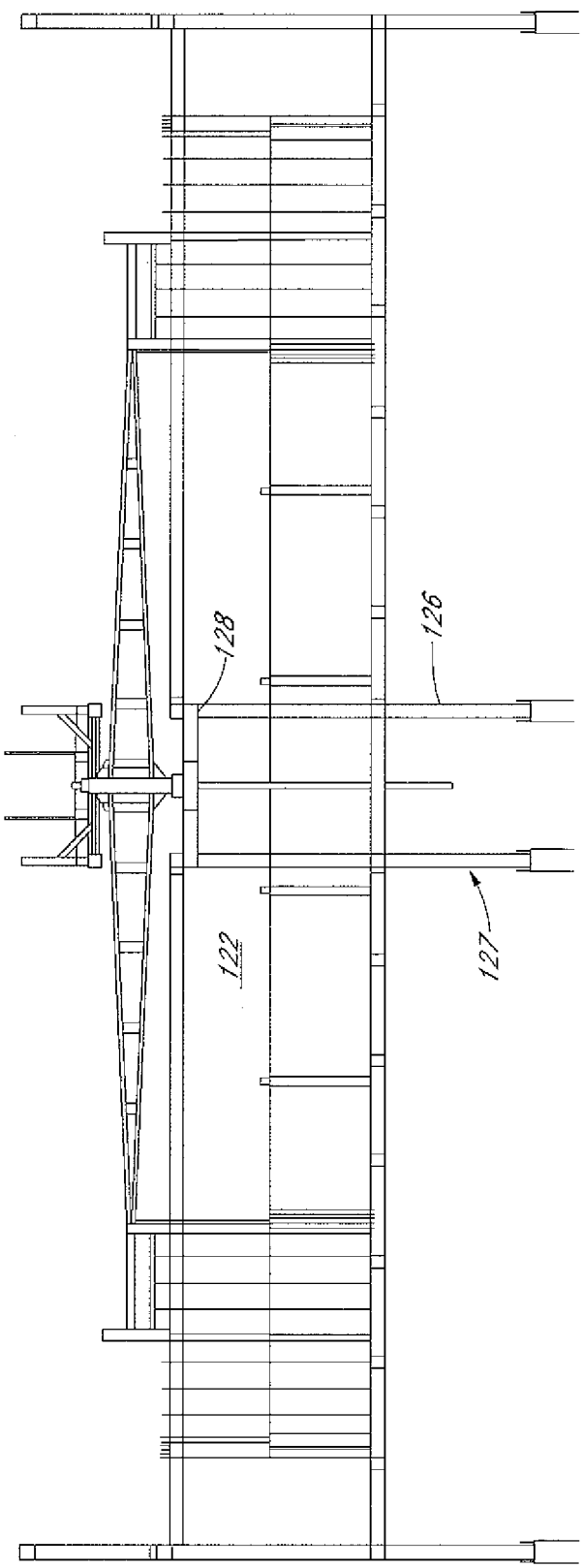
FIGS. 2A-2G are schematic illustrations of a rotor assembly of the enclosed wind turbine of FIGS. 1A-1C.
Figure 2B:
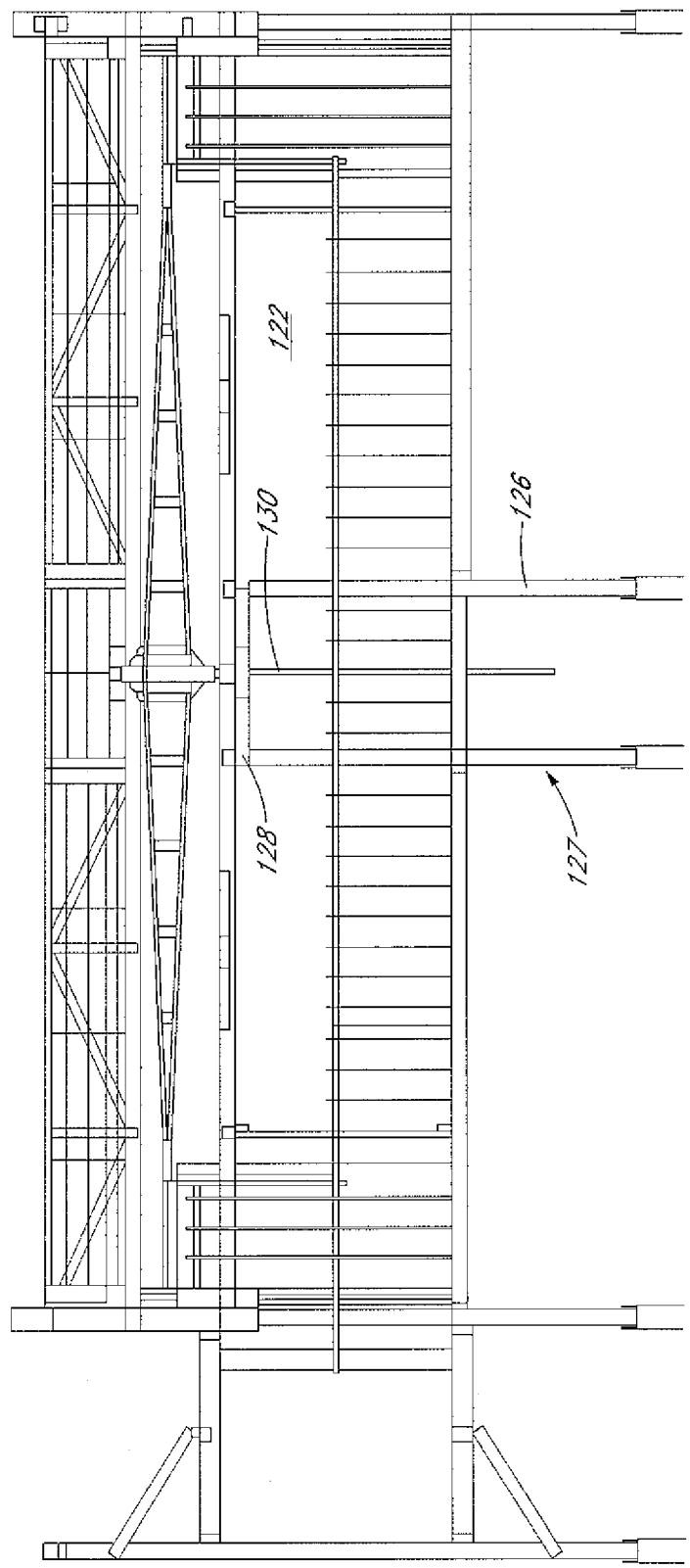

FIGS. 2A-2G provide exemplary illustrations of the components of one embodiment of a rotor assembly 102. As shown in FIGS. 2A and 2B, the rotor assembly 102 includes a mounting structure 127 that is comprised of a plurality of vertical legs 126 that contact the ground and a horizontal upper platform 128. A rotatable shaft 130 is positioned within the upper platform 128 with bearing assemblies and the like so that the rotatable shaft 130 can rotate within the mounting structure 127. A hub 132 (FIG. 2C-E) of the rotor 120 is then mounted to the rotatable shaft 128 so that the rotor can then rotate within the mounting structure 127. As is also shown in FIGS. 2A and 2B, various horizontal and vertical support structures can also be positioned within the housing 116 so as to stabilize the mounting structure 127 of the rotor assembly 102 when the rotor assembly 102 is rotating in response to wind being delivered to the rotor 120. It will be appreciated that the exact configuration of the rotor assembly 102 can vary depending upon the dimensions of the structure and other design configurations and that the configuration of FIGS. 2A and 2B are simply exemplary.

Figure 2C:
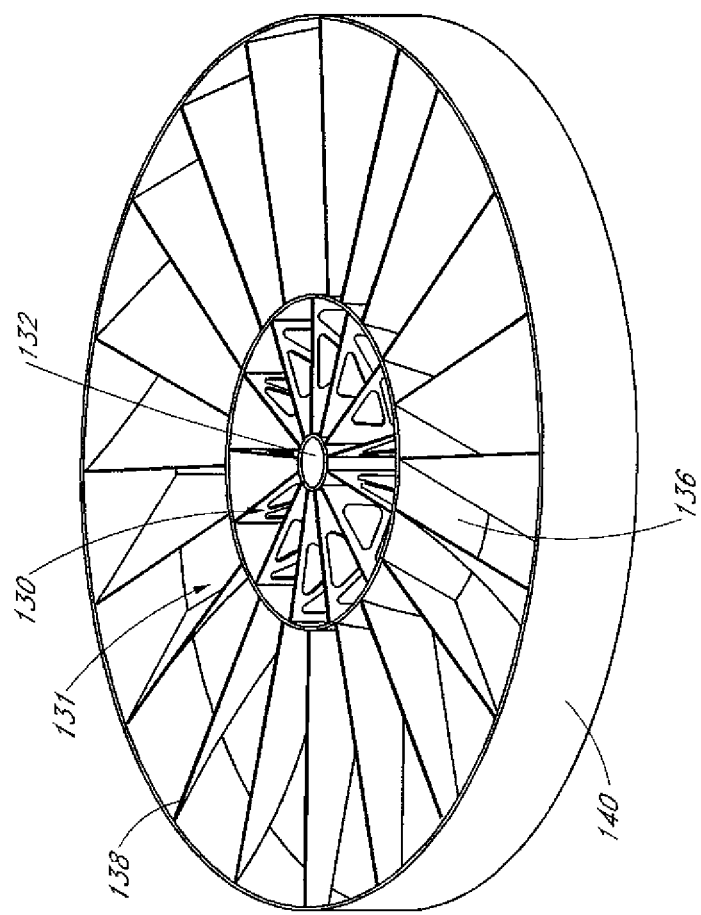
Figure 2D:
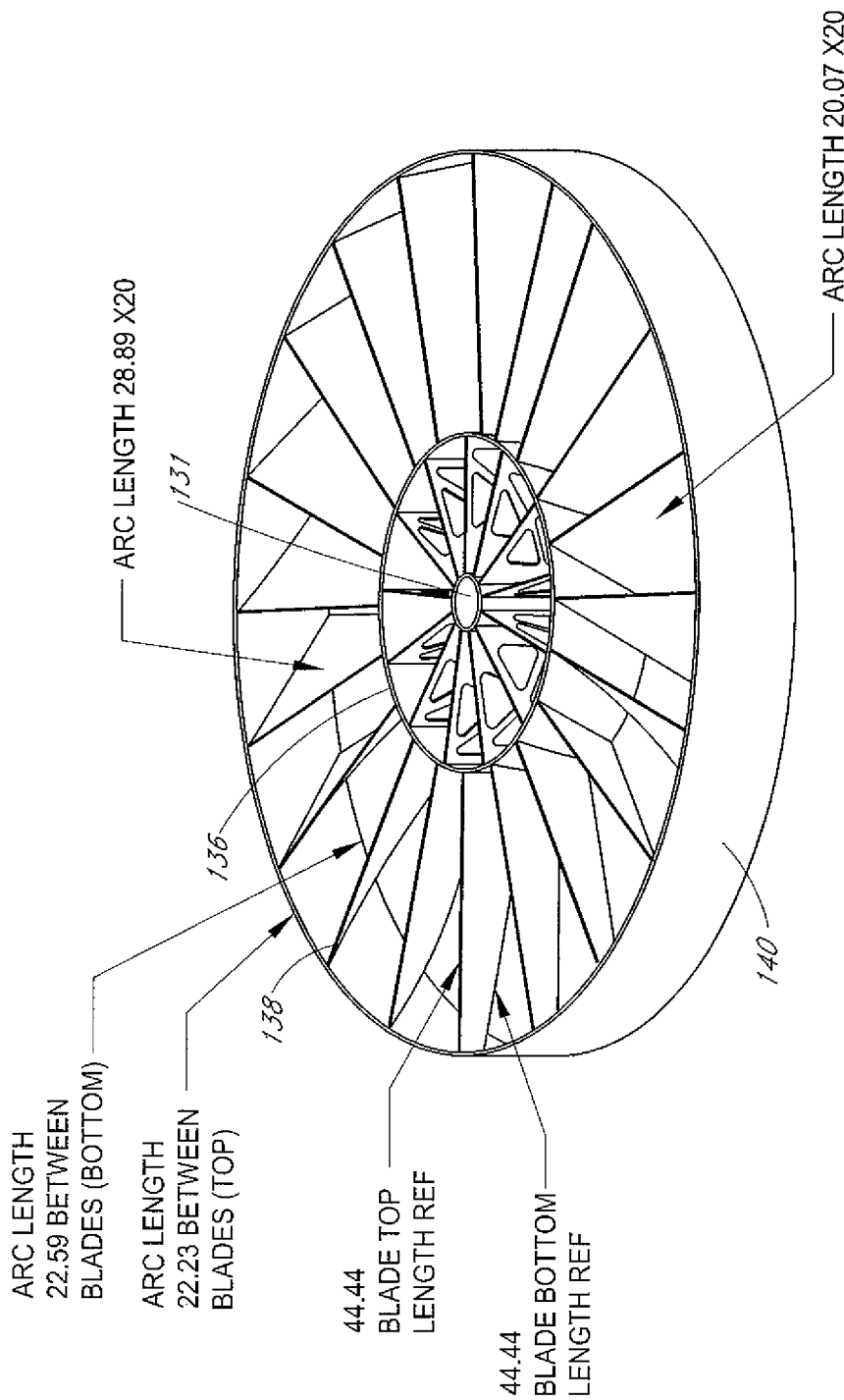
Figure 2E:
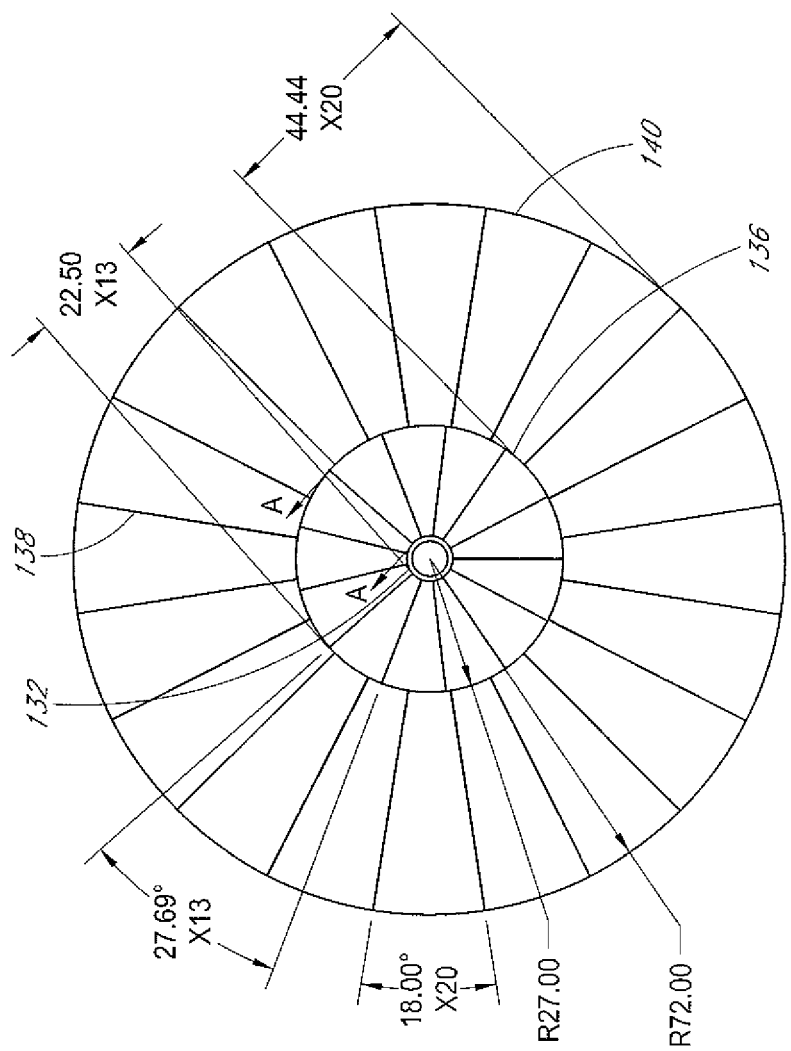

FIG. 2C-2E illustrates the rotor 120 of the rotor assembly 102. The rotor 120 in this implementation includes a hub assembly 131 that defines the hub member 132 that is positioned over the rotatable shaft 130. A plurality of radially extending support ribs 134 are positioned so as to extend outward from the hub member 132 and connect with an outer hub wall 136. A plurality of angled blades 138 are then connected to the outer hub wall 136 so as to extend further outward to terminate in an outer vane wall 140. The blades 138 are preferably angled such that air that is directed towards the blades 138 from a direction that is normal to the plane of the rotor 120 results in a horizontal force being exerted against the rotor 120 to induce the rotor 120 to rotate about the shaft 130. FIGS. 2D and 2E provide exemplary dimensions of the rotor 120 and the placement, angle and twist of the ribs 138 that are suitable for the instant application.

In one specific implementation, the hub assembly 131 has a diameter of 4.5 feet and the outer vane wall 140 has a diameter of 12 feet and the hub assembly 131 and outer vane wall 140 are 18 inches wide. Further, in this specific implementation, there are 20 blades 138 that extend from the top surface of the outer vane wall 140 to the bottom edge of the outer vane wall 140 at an angle and are spaced apart. It will, however, be apparent that various changes to the dimensions and configurations can be made by those skilled in the art.

Figure 2F:
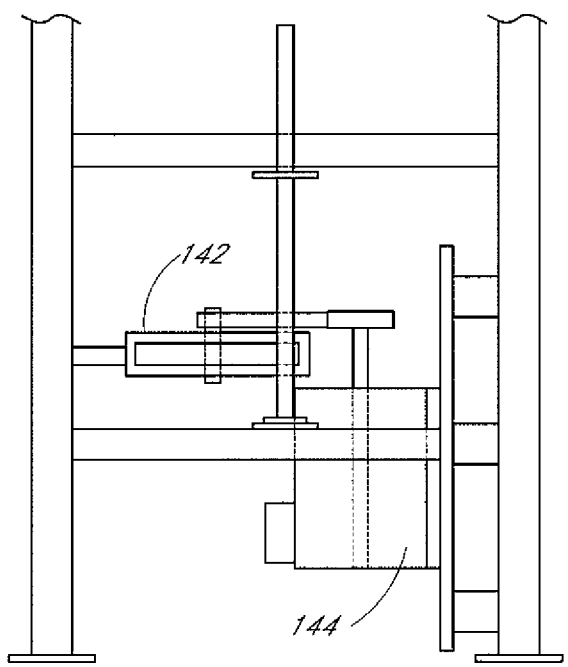
Figure 2G:
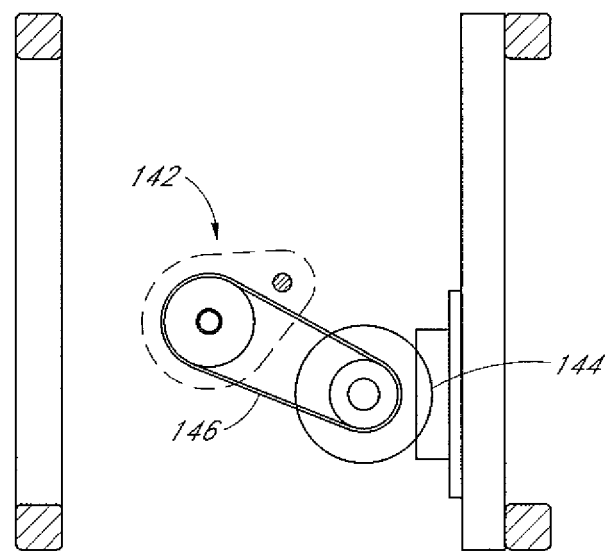

FIGS. 2F and 2G are exemplary illustrations of one embodiment of a transmission assembly 142 and power generator 144 that are coupled to the shaft 130 such that when the rotor 102 is induced to rotate in response to wind travelling through the channels 110, the rotational energy of the rotor 102 can be transferred into electrical power. The transmission assembly 142 converts the rotational energy from the rotating shaft 130 into linear energy via a system of belts 146 that are then connected to the generator motor 144 so that electrical energy can be produced by the generator motor 144. In one implementation, the generator motor 144 comprises a known generator motor 144 that produces electrical energy.

Figure 3A:
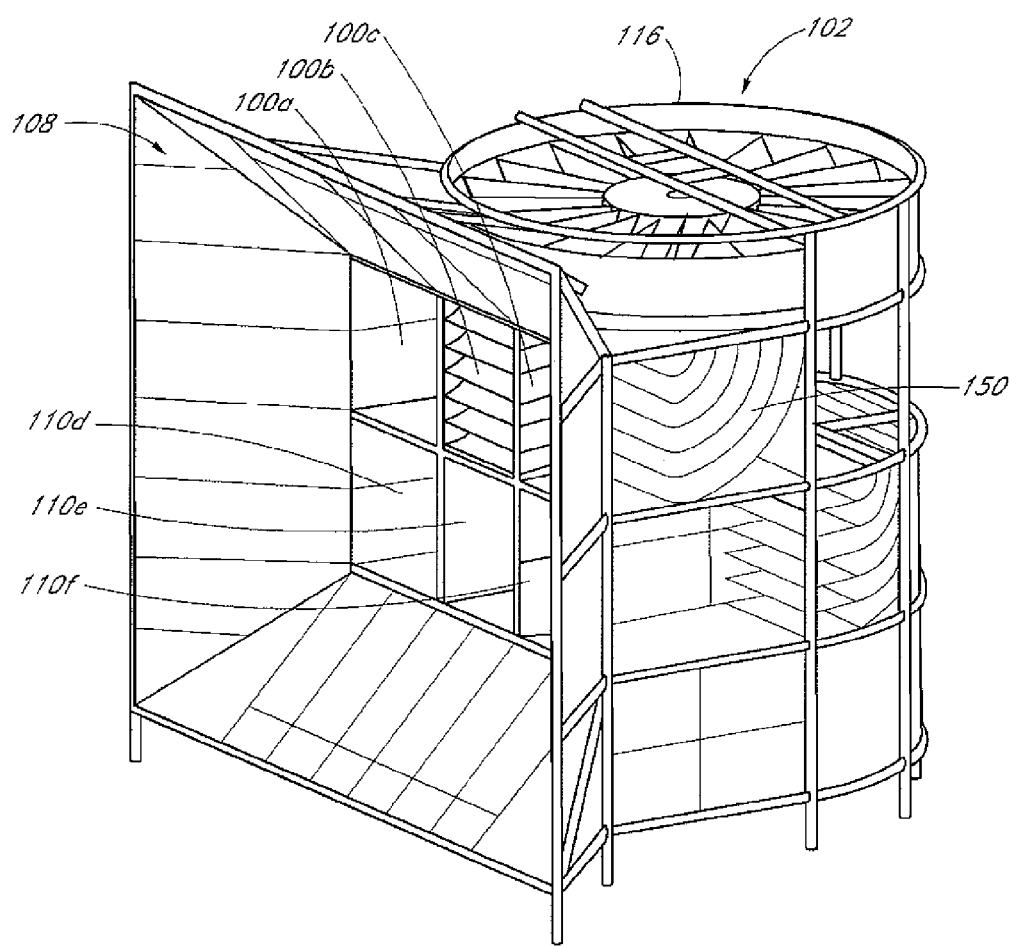
FIGS. 3A-3C are schematic illustrations of the wind turbine of FIGS. 1A and 1B with side panels partially removed to show channels.
Figure 3B:
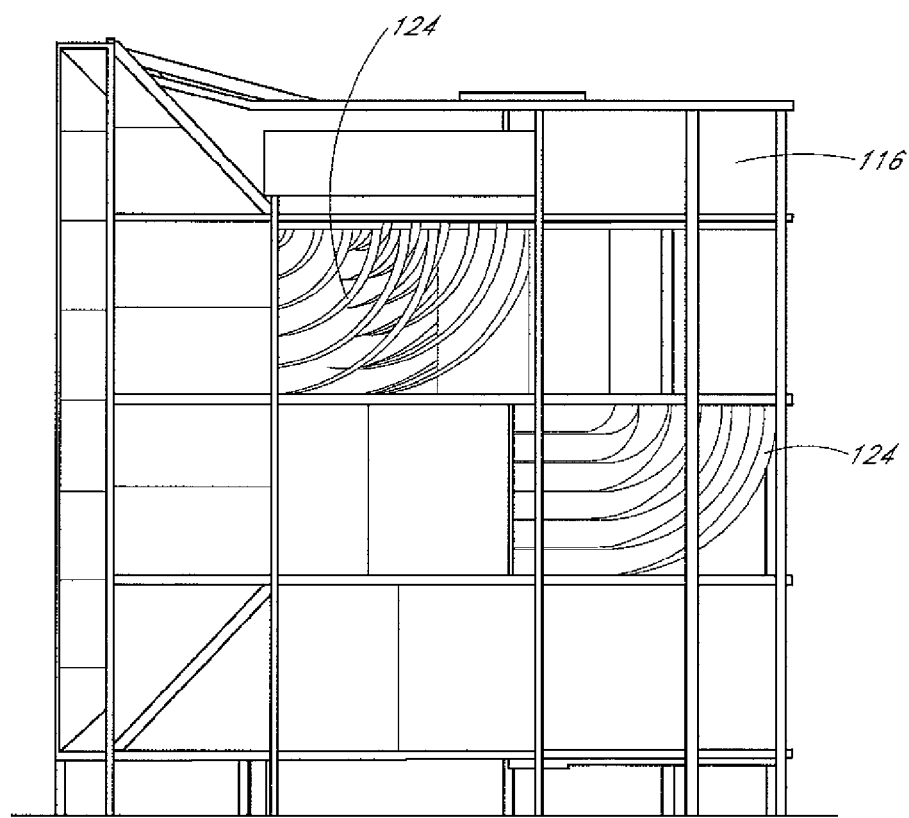
Figure 3C:
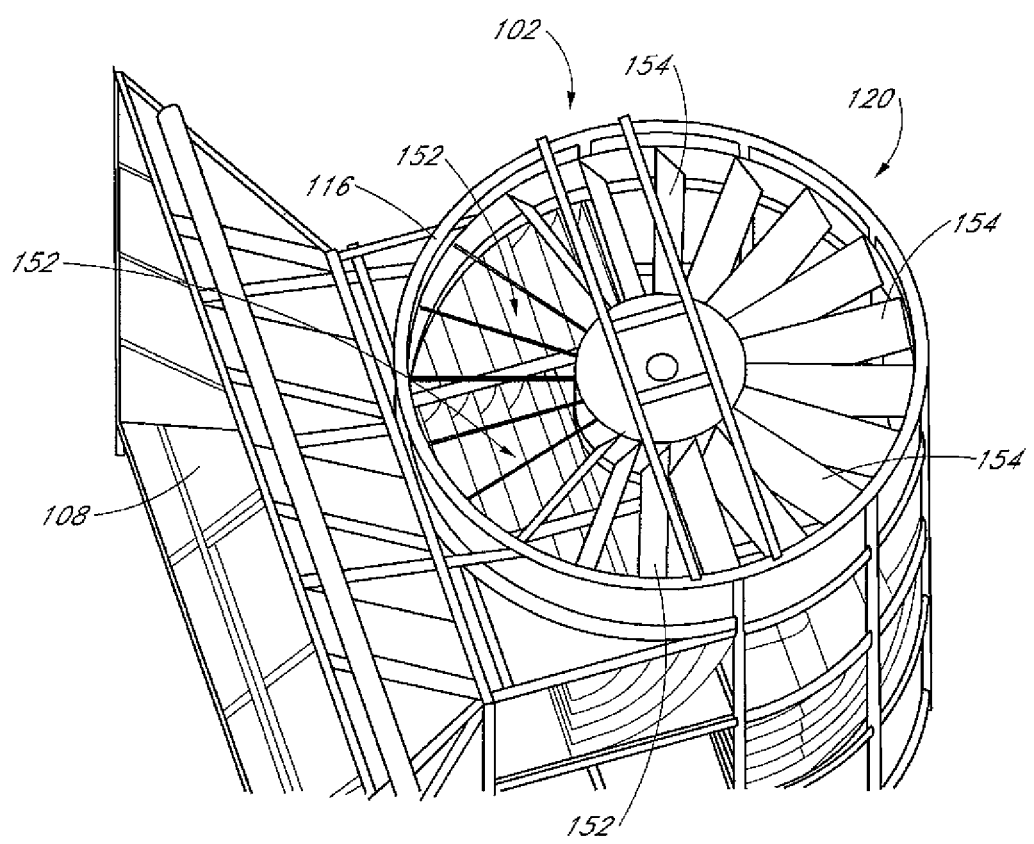

As discussed above, the rotor 102 receives air via the channels 110. The channels 110 are arranged within the housing 104 so that each radial portion of the rotor 120 is simultaneously receiving air from the channels 110. FIGS. 3A-3C are schematic illustrations of the housing 104 with portions of the outer wall removed so as to illustrates the channels 110 and vanes 124 that are positioned within the channels 110 to direction the air from the opening 108 when it is flowing substantially parallel to the plane of the rotor 120 to a direction where it is flowing substantially perpendicular to the plane of the rotor 120.

As shown and as discussed above, the three upper channels 110a, 110b, 110c are formed and have vanes 124 that are curved so as to direct the air flowing into those channels into the three 60 degree front segments 152 of the rotor 120. The three bottom channels 110d, 110e, 110f are formed and have vanes 124 that are curved so as to direct the air flowing into those channels into three 60 degree rear segments 154 of the rotor 120. In this way, the air that flows in through the opening 108 as a result of wind impacting upon the wind scoop opening assembly 106 is more evenly distributed about the rotor 120 so that substantially all surfaces of the rotor are simultaneously contributing to the conversion of wind energy into rotational energy of the rotor assembly 102. The channels 110 are square at the opening 108, however, at the exhaust, the openings are preferably sized and shaped to match the rounded contour of the section of the rotor 120 to which the channels 110 are exhausting air.

Figure 4A:
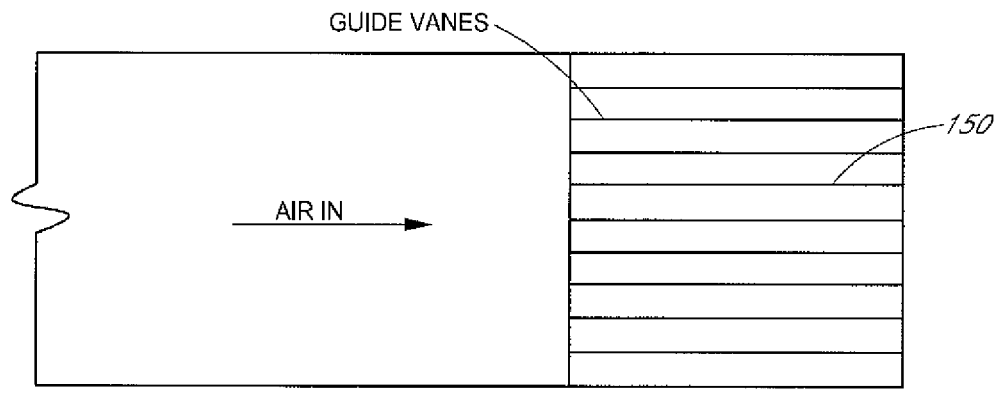
FIGS. 4A and 4B are detailed schematics illustrating components of the channels of FIGS. 3A-3C.
Figure 4B:
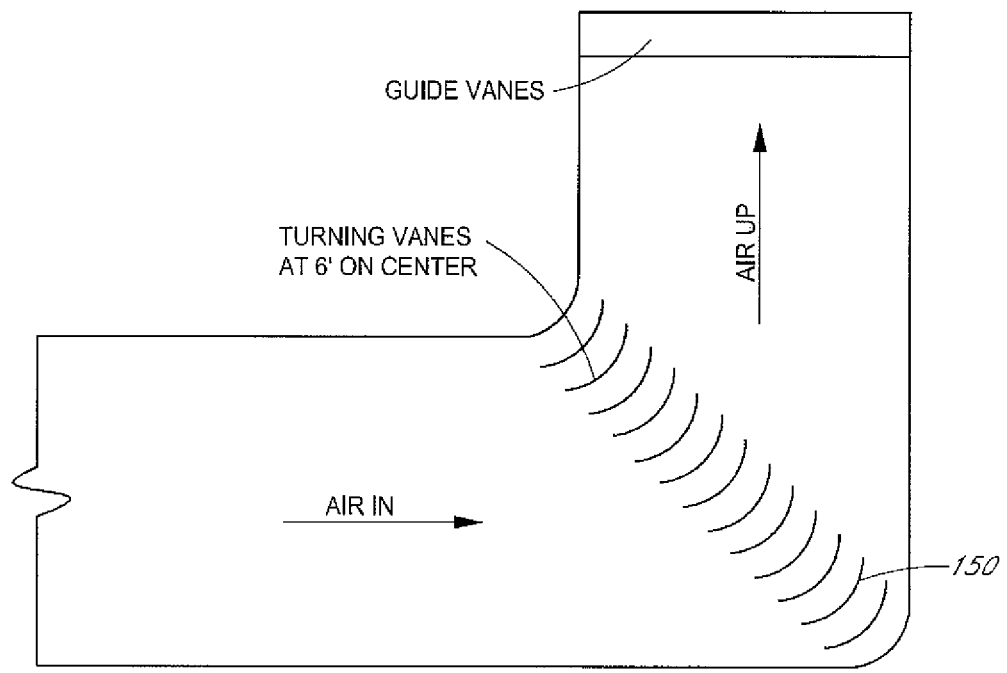

FIGS. 4A and 4B provide further illustrations of the vanes 150 that are positioned within the channels 110. Either the vanes 124 can extend through the entire channel, as shown in FIGS. 3A-3C, or the vane 124 can be truncated and only occur at the location where the air is being turned from the horizontal direction at the opening 108 to the vertical direction towards the plane of the rotor 120.

Figure 5:
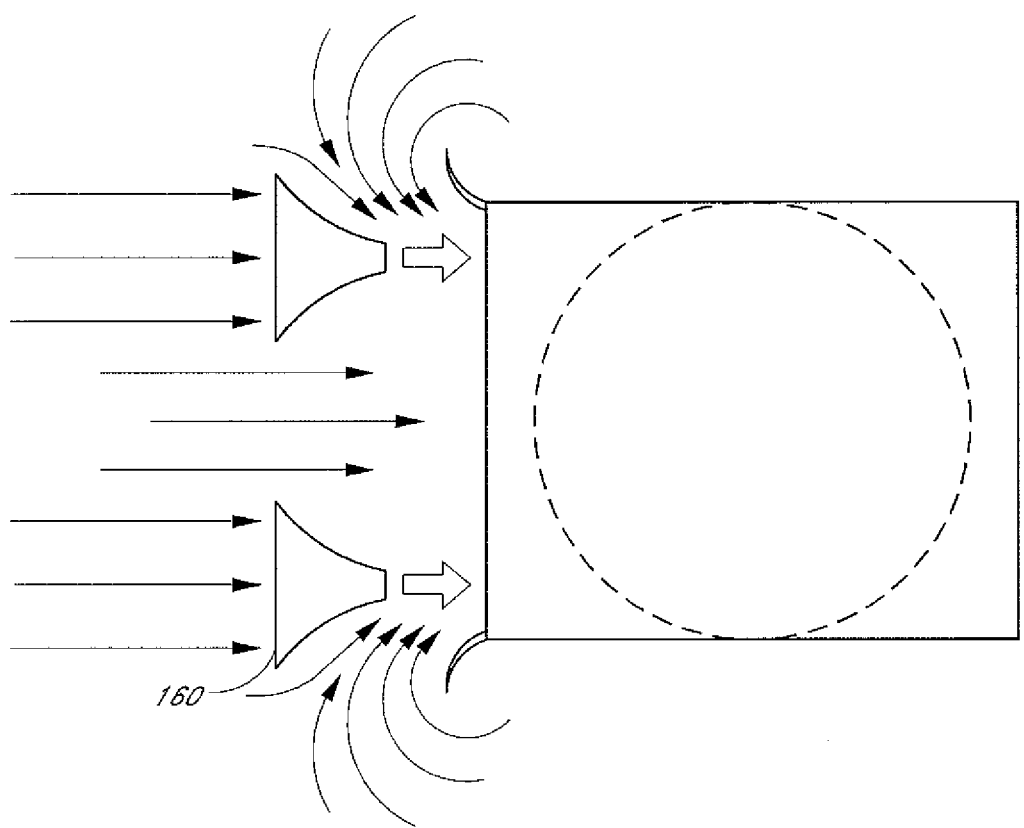
FIG. 5 is a schematic illustration of an optional air accelerator.

FIG. 5 illustrates a further optional feature of the assembly 100. Air accelerators 160 can also be positioned in the air flow paths that channel the air from a larger space to a smaller space so as to increase the pressure of the air. The wind scoop opening assembly 106 performs this function and the higher pressure air can result in greater force being directed against the surfaces of the blades 138 of the rotor 102. Additional or supplemental air accelerators 160 that similarly compress the air can also be included without departing from the scope of the present invention.

Exemplary Implementations

The Applicant has performed calculations of the performance of the disclosed embodiments to determine the potential power generation for this embodiment. These calculations are summarized below. It should be appreciated that, while these calculations demonstrate the efficacy of this design, the specific dimensions and embodiments disclosed herein should not be limiting on the scope of the patent that is being sought.

The following wind turbine configuration is for 12 feet diameter×20 blades, and with up to 40 mph wind calculations.

12 ft Diameter and 20 Blade Configuration.
Blade width:
Inner (approx.)=20.1735
Outer (approx.)=29.0527
Force from 2 mph wind:
P, Wind pressure (Psf), =0.00256×V^2 (V=wind speed in Mph)
=0.0102 psf=0.0000708 psi
A=The projected area of the item
=1078.42 in$^2$=7.489 ft$^2$
Cd, Drag coefficient, =2.0 for flat plates. For a long cylinder (like most antenna tubes), Cd=1.2.
Note the relationship between them is 1.2/2=0.6, not quite ⅔.
Force, F=A×P×Cd
=0.153 lbs=>0.153 lbs×20 blades=3.06 lbs Total Force.
Total Force at 45° (use normal to blade)=3.06 lbs×0.7071
=2.164 lbs (apply normal to blade surface).
Force from 12 mph wind:
P, Wind pressure (Psf), =0.00256×V^2 (V=wind speed in Mph)
=0.3686 psf=0.00256 psi
A=The projected area of the item
=1078.42 in$^2$=7.489 ft$^2$
Cd, Drag coefficient, =2.0 for flat plates. For a long cylinder (like most antenna tubes), Cd=1.2.
Note the relationship between them is 1.2/2=0.6, not quite ⅔.
Force, F=A×P×Cd
=5.521 lbs=>5.521 lbs×20 blades=110.42 lbs Total Force.
Total Force at 45°=110.42 lbs×0.7071
=78.078 lbs (apply normal to blade surface).
Force from 25 mph wind:
P, Wind pressure (Psf), =0.00256×V^2 (V=wind speed in Mph)
=1.600 psf=0.0111 psi
A=The projected area of the item
=1078.42 in$^2$=7.489 ft$^2$
Cd, Drag coefficient, =2.0 for flat plates. For a long cylinder (like most antenna tubes), Cd=1.2.
Note the relationship between them is 1.2/2=0.6, not quite ⅔.
Force, F=A×P×Cd
=23.965 lbs=>23.965 lbs×20 blades=479.3 lbs Total Force.
Total Force at 45°=479.3 lbs×0.7071
=338.913 lbs (apply normal to blade surface).
Force from 28 mph wind:
P, Wind pressure (Psf),=0.00256×V^2 (V=wind speed in Mph)
=2.007 psf=0.014 psi
A=The projected area of the item
=1078.42 in$^2$=7.489 ft$^2$
Cd, Drag coefficient, =2.0 for flat plates. For a long cylinder (like most antenna tubes), Cd=1.2.
Note the relationship between them is 1.2/2=0.6, not quite ⅔.
Force, F=A×P×Cd
=30.196 lbs=>30.196 lbs×20 blades=603.92 lbs Total Force.
Total Force at 45°=603.92 lbs×0.7071
=427.032 lbs (apply normal to blade surface).
Force from 40 mph wind:
P, Wind pressure (Psf),=0.00256×V^2 (V=wind speed in Mph)
=4.096 psf=0.028 psi
A=The projected area of the item
=1078.42 in$^2$=7.489 ft$^2$
Cd, Drag coefficient, =2.0 for flat plates. For a long cylinder (like most antenna tubes), Cd=1.2.
Note the relationship between them is 1.2/2=0.6, not quite ⅔.
Force, F=A×P×Cd
=60.392 lbs=>60.392 lbs×20 blades=1,207.84 lbs Total Force.
Total Force at 45°=1,207.84 lbs×0.7071
=854.064 lbs (apply normal to blade surface).
Using the above-force calculations applied to the rotor assembly 102 described above and using the below formulas yields the following power generation:

Power Calculation Formulas:

$$\text{Torque}_{inlb} = \frac{\text{Power}_{hp} \cdot 63025}{\text{RPM}}$$

+

$$\text{Power}_{hp} = \frac{\text{RPM} \cdot \text{Torque}_{inlb}}{63025}$$

$$1 \cdot \text{hp} = 745.7 \text{ W}$$

$$\text{RPM} = \frac{63025 \cdot \text{Power}_{hp}}{\text{Torque}_{inlb}}$$

centripetal acceleration

| | |
|---|---|
| $a = \dfrac{v^2}{r}$ | Centripetal acceleration |
| $v = \sqrt{ar}$ | velocity |
| $r = \dfrac{v^2}{a}$ | radius | circular velocity

| | |
|---|---|
| $v = \dfrac{2\pi r}{T}$ | circular velocity |
| $r = \dfrac{vT}{2\pi}$ | radius |
| $T = \dfrac{2\pi r}{v}$ | period |

| Wind Speed (mph) | Turbine Diameter | No. Blades | Torque (in-lb) | Torque (ft-lb) | RPM | Power (hp) | Power (watts) |
|---|---|---|---|---|---|---|---|
| 2 | 12 | 20 | 79.453 | 6.621 | 6.928 | 0.009 | 6.513 |
| 12 | 12 | 20 | 2866.676 | 238.890 | 41.615 | 1.893 | 1411.496 |
| 25 | 12 | 20 | 12443.39 | 1036.949 | 86.701 | 17.118 | 12764.803 |
| 28 | 12 | 20 | 15678.75 | 1306.563 | 97.310 | 24.208 | 18051.787 |
| 40 | 12 | 20 | 31357.48 | 2613.123 | 112.378 | 55.913 | 41694.01721 |

A. Summary Comparison

| Wind Speed (mph) | Turbine Diameter | No. Blades | Torque (in-lb) | Torque (ft-lb) | RPM | Power (hp) | Power (watts) |
|---|---|---|---|---|---|---|---|
| 2 | 12 | 20 | 79.453 | 6.621 | 6.928 | 0.009 | 6.513 |
| 12 | 12 | 20 | 2866.676 | 238.890 | 41.615 | 1.893 | 1411.496 |
| 25 | 12 | 20 | 12443.39 | 1036.949 | 86.701 | 17.118 | 12764.803 |
| 28 | 12 | 20 | 15678.75 | 1306.563 | 97.310 | 24.208 | 18051.787 |
| 40 | 12 | 20 | 31357.48 | 2613.123 | 112.378 | 55.913 | 41694.01721 |

B. Efficiency Considerations

Total efficiency loss is 11% (from +20% −15% −16% calculated below). This takes into account chamber improvements, otherwise it would be a 31% efficiency loss.

i. Chamber

Wind is collected and enters the chamber at the upper and lower inlets. The upper inlet feeds the forward-most turbines while the lower inlet feeds the aft-most turbines. The chamber is 360° adjustable to face the wind from any direction.

The wind exits the chamber vertically onto the turbine blades.

The above calculations demonstrate that there is a significant improvement in efficiency in the generation of power using the enclosed wind turbine with the stack effect and the air pressurization features of the wind scoop. Although the foregoing has shown, illustrated and described various embodiments and uses of the present invention, it will be apparent from the foregoing description that various changes, modifications and alterations to the systems described herein, and the uses thereof may be made by those skilled in the art without departing from the spirit of the present invention. Hence, the scope of the present invention should not be limited to the foregoing discussion but should be defined by the appended claims and all reasonable interpretations of scope thereof.

What is claimed is:

1. A wind powered turbine assembly comprising:
   an enclosure that defines an interior space wherein the enclosure defines openings through which air can flow into the enclosure and wherein the interior space defines two adjacent vertical columns;
   a rotor having a plurality of fan blades positioned within the enclosure, wherein the rotor is mounted so as to have an axis of rotation that extends in a direction perpendicular to the direction of the airflow;
   a plurality of channels formed in the enclosure so as to direct air from the openings to the rotor wherein the plurality of channels are formed into an upper and a lower row and are bent so that the lower row of channels are routed into the first column and the upper row are bent so that the upper row are routed into the second column and wherein the columns direct the channels to the rotor; and
   wherein the enclosure defines an exhaust stack that extend out of a top surface of the enclosure from which air can be extracted from the enclosure after inducing the rotor to rotate wherein a flange extends about the exterior surface of the exhaust stack opening to shelter the rotor from external air flow and to create a negative pressure to draw air out of the interior space of the enclosure.

2. The assembly of claim 1, wherein the enclosure has multiple stories and the channels extend along each of the multiple stories.

3. The assembly of claim 1 wherein the channels are curved and wherein turning vanes are included in the channels to facilitate flow of air.

4. The assembly of claim 1, wherein the exhaust stack has an opening that is sized to be approximately the same size as the rotor.

5. The assembly of claim 1, further comprising screens that inhibit the entry of animals into the interior space.

6. The assembly of claim 1, wherein the enclosure is cylindrical.

7. A wind powered turbine assembly comprising:
- an enclosure that define an interior space and at least one side wall wherein an opening is formed in at least one side wall and wherein the enclosure defines two adjacent vertical columns;
- an air scope assembly mounted to the at least one side wall wherein the air scope assembly has a surface area greater than the at least one opening and gathers wind to deliver to the at least one opening;
- a rotor assembly positioned within the enclosure wherein the rotor assembly includes a rotor that rotates in response to air being delivered to the rotor in a direction that has a component that is parallel to at least one the side wall;
- a plurality of channels that extend from the at least one opening to the rotor so as to deliver air to the rotor at a plurality of locations about the rotor wherein the plurality of channels are formed into an upper and a lower row and are bent so that the lower row of channels are routed into the first column and the upper row are bent so that the upper row are routed into the second column and wherein the columns direct the channels to the rotor and wherein an exhaust opening is formed adjacent the upper end of the enclosure and wherein the rotor is recessed below the exhaust opening so that the exhaust opening induces a stack effect on the air that is flowing through the rotor.

8. The assembly of claim 7, wherein the enclosure comprises a cylindrical enclosure at the axis of the rotor is parallel to the axis of the cylindrical enclosure.

9. The assembly of claim 7, wherein the rotor assembly includes a transmission and a generator that are connected to the rotor so that rotation of the rotor induces the generator to produce electricity.

10. The assembly of claim 7, wherein screen are formed over the at least one opening that permit air to enter into the enclosure but inhibit birds or animals from entering the enclosure and contacting the rotor.

11. The assembly of claim 7, further comprising at least one air accelerator that reduces the volume of space the air is flowing in to the rotors and thereby increases the air pressure.

12. The assembly of claim 7, wherein the plurality of channels comprises two rows of channels that deliver air to a plurality of sectors of the rotor.

13. The assembly of claim 12, wherein there are two rows of three channels.

14. The assembly of claim 7, wherein the plurality of channels extend in a direction perpendicular to the axis of rotation of the rotor and then parallel to the axis of rotation.

15. The assembly of claim 14, wherein vanes are formed in the plurality of channels.

16. The assembly of claim 7, wherein the rotor comprises a ring shaped rotor having plates that extend radially outward from the axis of rotation.

17. The assembly of claim 16, wherein the rotor includes a hub assembly and an outer blade wall wherein the blades extend from hub assembly to the blade wall.

18. The assembly of claim 17, wherein the rotor is 12 feet in diameter and has a height of 18 inches and the blades extend radially approximately 4 feet and are set at an angle and twist with respect to the axis of rotation of the rotor.

* * * * *